United States Patent
Hettstedt et al.

(10) Patent No.: US 8,032,148 B2
(45) Date of Patent: Oct. 4, 2011

(54) METHOD AND SYSTEM FOR WIRELESS CELLULAR INDOOR COMMUNICATIONS

(75) Inventors: Heinz-Dieter Hettstedt, Isernhagen (DE); Roland Münzner, Bissingen/Teck (DE); Ekkehard Schomburg, Burgwedel (DE)

(73) Assignee: Alcatel Lucent, Paris (FR)

( * ) Notice: Subject to any disclaimer, the term of this patent is extended or adjusted under 35 U.S.C. 154(b) by 839 days.

(21) Appl. No.: 11/942,442

(22) Filed: Nov. 19, 2007

(65) Prior Publication Data

US 2008/0119198 A1    May 22, 2008

(30) Foreign Application Priority Data

Nov. 20, 2006 (EP) .................................... 06301157

(51) Int. Cl.
*H04W 72/00* (2009.01)
(52) U.S. Cl. .................. 455/453; 455/560; 455/561
(58) Field of Classification Search .................. 455/453, 455/560, 561
See application file for complete search history.

(56) References Cited

U.S. PATENT DOCUMENTS

| | | | | |
|---|---|---|---|---|
| 5,796,722 | A | * | 8/1998 | Kotzin et al. .................. 370/252 |
| 6,459,909 | B1 | * | 10/2002 | Bilcliff et al. .............. 455/562.1 |
| 6,477,154 | B1 | | 11/2002 | Cheong et al. |
| 2006/0246911 | A1 | * | 11/2006 | Petermann .................... 455/444 |

FOREIGN PATENT DOCUMENTS

| | | | |
|---|---|---|---|
| EP | 1085773 A1 | | 3/2001 |
| EP | 1617598 A1 | | 1/2006 |
| WO | 03/013065 A1 | | 2/2003 |
| WO | 03/079645 | * | 9/2003 |
| WO | 2004/025887 | * | 3/2004 |

OTHER PUBLICATIONS

EP App. No. 06301157.1, European Search Report and Written Opinion, May 15, 2007, 8 pages.
PCT App. No. PCT/EP2007/010029, PCT Search Report, Apr. 29, 2008, 3 pages.
PCT App. No. PCT/EP2007/010029, PCT Written Opinion, Apr. 29, 2008, 6 pages.

* cited by examiner

*Primary Examiner* — Rafael Pérez-Gutiérrez
*Assistant Examiner* — Munjalkumar Patel
(74) *Attorney, Agent, or Firm* — Fay Sharpe LLP

(57) ABSTRACT

The invention relates to a method for wireless cellular indoor communications, the method comprising at least one base station connected to a cell management unit through a first digital connection interface, the cell management unit connected to at least one RF hub through a second digital connection interface, and the at least one RF hub connected to at least one remote radio head through a third digital connection interface, the at least one remote radio head providing service in a certain cell area inside a confined environment, and the cell management unit comprising means for providing efficient load balancing at and between base stations through adaptive cell reconfiguration; means for mapping carriers, time, frequency or time-frequency allocations to individual radio heads; means for alignment of individual delays accumulated on the digital connections between the cell management unit and each of the radio heads; means for synchronization of the signals between the cell management unit and the individual remote radio heads; and means for failure detection of the individual digital links between the cell management unit and the remote radio heads.

18 Claims, 4 Drawing Sheets

METHOD AND SYSTEM FOR WIRELESS CELLULAR INDOOR COMMUNICATIONS

BACKGROUND OF THE INVENTION

The invention is based on the priority application EP 06301157.1 which is hereby incorporated by reference.

The present invention relates to indoor communications systems, and particularly to wireless cellular communications systems in buildings and tunnels.

Wireless communications systems are becoming an increasingly widespread phenomenon of modern communications. Since many users place an increasing number of cellular calls or data transmissions within buildings or other confined structures, there is a need to achieve high quality indoor coverage at appropriate capacity.

A conventional configuration to extend a wireless communications service e.g. GSM or UMTS, from an outdoor environment to an indoor area is shown in FIG. 1 and is characterized by the utilization of a repeater R that is typically located within a building B to retransmit within the building a wireless signal Ws received at an external antenna A1 or retransmit outside the building the wireless signals Ws of mobile stations Ms, e.g. mobile phones, handheld computers and the like, located inside the building B. In the downlink, that is when the wireless signals Ws from the external environment are transmitted to the mobile stations Ms inside the building B, said outdoor wireless signals are passed along a first connection Co1 to the repeater R which forwards the signal along a second connection Co2 to a plurality of interconnected amplifiers Am, the amplifiers amplify the signals which are then transmitted over the in-building antennas A2 to A4. In the uplink direction, that is, when the wireless signals Ws from the mobile stations Ms are transmitted to a wireless infrastructure outside the building B, the repeater R receives said signals along connection Co2 and transmits them along connection Co1 to the external antenna A1.

It is also possible that the repeater R of the indoor communications structure is replaced by a base station connected to a communications core network along connection Co1. Typically, the information is distributed via analogue signals inside the buildings and confined areas.

Another known indoor communications system providing wireless cellular service is shown in FIG. 2. A core network CN is connected to a base station Bs. The radio frequency (RF) signals from the base station or an off-air repeater OAR are digitized into base band signals in a base station interface BSI (and vice versa in uplink transmission) and distributed in the form of data packets using data cables, e.g. category 5 (CAT5) or optical fiber, to at least one Ethernet switch ES. The Ethernet switch ES then distributes the information to the corresponding remote radio heads RH1 to RH4 serving a particular cell area C1 and C2. An example of such system is disclosed in Patent Application US 2005/0157675 A1. An advantage of such systems is that they provide a cost-effective solution due to the use or re-use of low cost distribution cabling which is usually already present, totally or partly, in buildings and used for other types of digital communications e.g. local area network LAN structures using Ethernet protocol.

Using standard Ethernet switches, cell configurations can be achieved due to the sectorization of data flow. Normally, an Ethernet hub is needed in each Ethernet sector for data distribution in downlink and data packaging in uplink. The hub function is placed in at least one of the associated remote radio heads. In complex systems, series of Ethernet switches are necessary and bottlenecks of data flow are evident due to the 1 to n distribution characteristic of the Ethernet switch resulting in limiting the capacity of the network.

SUMMARY OF THE INVENTION

The object of the present invention is to provide a method and a system for wireless cellular indoor communications with improved cell and load balancing management.

The object is achieved by a wireless cellular indoor communications system comprising at least one base station connected to a cell management unit through a first digital connection interface, the cell management unit connected to at least one RF hub through a second digital connection interface, and the at least one RF hub connected to at least one remote radio head through a third digital connection interface, the at least one remote radio head providing service in a certain cell area inside a confined environment,
the cell management unit comprising
means for providing efficient load balancing at and between base stations through adaptive cell reconfiguration,
means for mapping carriers, time, frequency or time-frequency allocations to individual radio heads,
means for alignment of individual delays accumulated on the digital connections between the cell management unit and each of the radio heads,
means for synchronization of the signals between the cell management unit and the individual remote radio heads,
means for failure detection of the individual digital links between the cell management unit and the remote radio heads.

This object is further achieved by a method for wireless cellular indoor communications, the method comprising
a base station transmitting or receiving call or data information to/from a cell management unit through a first digital connection interface,
the cell management unit transmitting or receiving call or data information to/from at least one RF hub through a second digital connection interface, and
the at least one RF hub transmitting or receiving call or data information to/from at least one remote radio head through a third digital connection interface, the at least one remote radio head providing service in a certain cell area inside a confined environment, and
the cell management unit
providing efficient load balancing at and between base stations through adaptive cell reconfiguration,
mapping carriers, time, frequency or time-frequency allocations to individual radio heads,
aligning individual delays accumulated on the digital connections between the cell management unit and each of the radio heads,
synchronizing signals between the cell management unit and the individual remote radio heads,
detecting failure of the individual digital links between the cell management unit and the remote radio heads.

The system for wireless cellular indoor communications of the invention uses a cell management unit with complex matrix function, instead of distributed standard Ethernet switches, for flexible cell management of multi-service and multi-operator functions.

The cell management unit is the interface between a number of base stations and the Ethernet connection. It provides multi-functions for a broad scope of complex scenarios of operation, with multi-carrier, multi-service and multi-operator functions, and efficient data management. In this way, the remote radio heads can be used in parallel for different services and at different functions, such as for frequency division duplex (FDD) and time division duplex (TDD). The remote radio heads are serviced by RF-Hubs similar to the original Ethernet hub functionality. Due to a compact arrangement of the cell management unit, data concentrations can be avoided and high data transfer can be achieved in complex networks.

The cell management unit provides data management in terms of packaging and addressing to the radio heads in downlink and un-packaging and addressing to the base stations in uplink. Since the cell management unit performs the frequency allocation of the remote radio heads, cell management for different services and operators can be achieved. Cell management can be performed manually, by software control or even automatically adaptive to current cell scenarios.

Due to a traffic activity control, un-used carriers in remote radio heads can be de-activated at locations of low traffic and can be shifted and activated in remote radio heads at locations of high traffic. The load-balancing in base stations can be performed independently of the cell management function. In this way, capacity can follow moving users in complex buildings, such as airports, stations, etc., with dynamic distribution of hot-spots.

Cost optimization can be achieved when cell architectures must no longer be designed for peak traffic with moving users all over the whole building. Further cost optimization is achieved using base stations with digital interface and remote radio heads at dedicated locations, where capacity and coverage is needed. Additionally, since information is distributed in digital base-band, cost-effective transport can be used or eventually re-used, such as CAT5 cabling and optical fiber. Due to the LAN characteristic of the digital distribution infrastructure, the remote radio heads can advantageously be easily relocated.

Radio heads can be designed using low-cost technology of mobile stations avoiding high RF transmission levels.

BRIEF DESCRIPTION OF THE DRAWINGS

An embodiment example of the invention is now explained with the aid of FIGS. 1 to 6.

Figure 1:
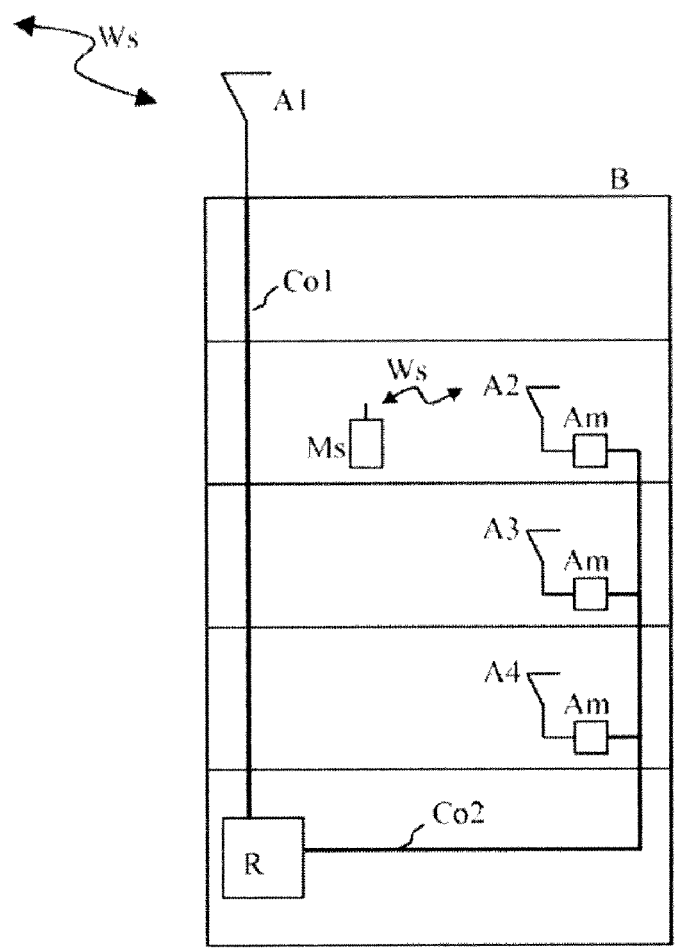
FIG. 1 shows a first typical indoor communications system structure, for analogue systems, according to the prior art.
Figure 2:
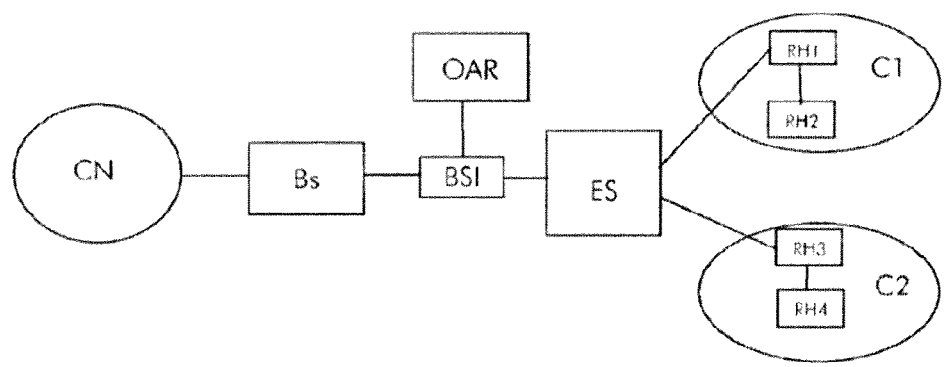
FIG. 2 shows a wireless cellular indoor communications system, with digital distribution of signals over Ethernet, according to the prior art.
Figure 3:
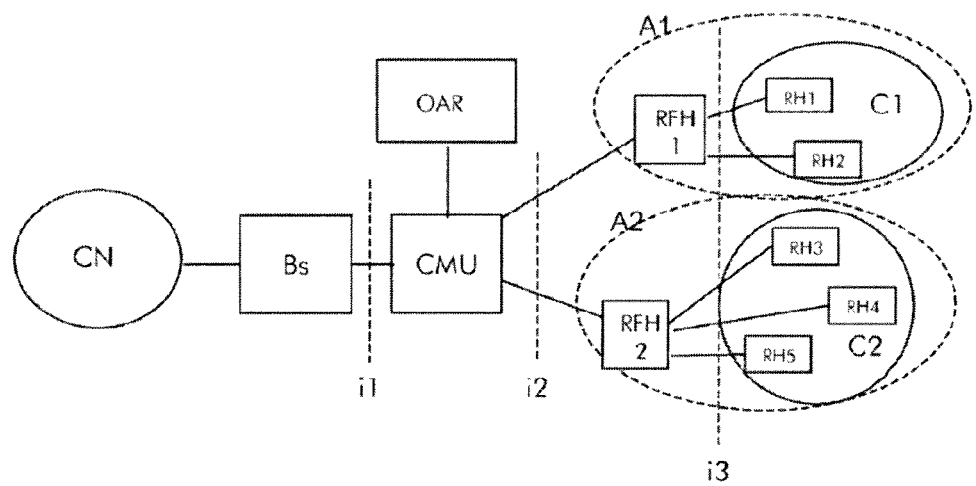
FIG. 3 shows a first example of a wireless cellular indoor communications system, with separated cell configuration, according to the invention.

A first example of a wireless cellular indoor communications system structure according to the invention is shown in FIG. 3, comprising a core network CN, a base station Bs, a cell management unit CMU, an off-air repeater (OAR), digital interfaces i1 to i3, RF hubs RFH1 and RFH2, and remote radio heads RH1 to RH5.

In the downlink direction, communications core network signals intended for the mobile station inside the indoor environment, e.g. a building or a tunnel, are received by the base station Bs. Said signals are then passed in digital form through a first connection interface i1, e.g. an electrical or optical connection using Ethernet protocol or of other standards (e.g. open base station architecture initiative (OBSAI) or common public radio interface (CPRI)), to the cell management unit CMU. The cell management unit CMU performs data packaging in downlink and forwards said digital packets through a second digital connection interface i2, e.g. an electrical or optical connection using Ethernet protocol, to the RF Hubs RFH1 and RFH2, which in turn pass the packets through a third connection interface i3, e.g. an electrical or optical connection using Ethernet protocol, to the remote radio heads RH1 to RH5.

Similarly, in the uplink direction, radio signals Ws transmitted by the mobile stations located in the indoor environment are received by the remote radio heads RH1 to RH5 and sent to the core network CN with data packaging in the RF Hubs.

The base station is a conventional base station without radio equipment. The cell management unit CMU provides transparent operation of the radio heads RH1 to RH5 from the base station and comprises standard digital interfaces to the base station Bs and to the off-air repeater OAR, at least one Ethernet interface to connect the RF Hubs RFH1 and RFH2, an intelligent switching unit for data distribution and cell organization configurable in size and functionality according to system dimensions, a complex matrix function to combine different base stations with a number of RF hubs, multi-service and multi-operator functionality for full transparency, flexible cell management for static cell configurations, automatic cell management for adaptive cell configurations.

The CMU preferably comprises the following functionality (in a form independent of the used air interface standard):

means for supporting efficient load balancing at and between base stations through adaptive cell reconfiguration, especially through the shifting of un-used carriers from radio heads inside areas of low traffic load to radio heads inside areas of high traffic load, e.g. means for individual load identification for each carrier on each of the radio heads by air interface activity detection and interference sensing. Air interface activity detection thereby is realized on the basis of the individually supported air interface protocols; means for de-activation of un-used carriers per radio head on an individual basis; means for shifting carriers from radio heads, where these carriers are not used for radio heads with high load on their active carriers, means for activation of the shifted carriers at locations (radio heads) of high loading. The cell management unit mechanism of adaptive cell reconfiguration thereby will neither require any changes to the load balancing mechanisms at or between the access nodes (e.g. BTS, Node-B, WiMAX base station) nor any dedicated messaging between access nodes and CMU for supporting load balancing.

mapping means from carriers or time, frequency or time-frequency allocations to individual radio heads, as identified e.g. through their MAC addresses or the connectors of the respective digital lines to which the radio heads are connected, delay management means for alignment of the individual delays accumulated on the digital connections between the cell management unit and each of the radio heads, means for synchronization of the signals between the cell management unit and the individual radio heads, failure detection means for the individual digital links between the cell management unit and the radio heads.

The RF hubs provide data distribution to the remote radio heads in downlink and data packaging in uplink The remote radio heads RH1 to RH5 are RF air interfaces to users providing a digital interface to the network. They are part of the BTS according to standards, such as OBSAI or CPRI. The remote radio heads are equipped to transmit four carriers over the full RF bandwidth of each service but channel-selective at least in uplink. In this way, a remote radio head can operate individually for dedicated operators only. Since frequency allocation of each carrier can be tuned remotely by the cell management unit CMU, the remote radio heads RH1 to RH5 can represent an individual cell and/or can be part of a greater cell. Thus, in both cases, extension of capacity and/or coverage, can be achieved. Different types of remote radio heads can be planned either for FDD or for TDD operation.

In FIG. 3, the wireless cellular indoor communications system, according to the invention, is illustrated with separated cell configuration, that is, a first RF Hub RFH1 is connected to two remote radio heads RH1 and RH2 which provide service in a first cell area C1 inside a certain first indoor location area A1, and a second RF Hub RFH2 is connected to three remote radio heads RH3 to RH5 which provide service in a second cell area C2 inside a certain second indoor location area A2, and the first and second indoor location areas A1 and A2 being isolated or separated. On the other hand, FIG. 4 illustrates a wireless cellular indoor communications system, according to the invention, which presents overlapping cell configuration, that is, now the first RF Hub RFH1 is connected to two remote radio heads RH1 and RH2, RH1 providing service in cell C1, and RH2 providing service in cell C2, and cells C1 and C2 overlapping in the same indoor location area A1, and the second RF Hub RFH2 is connected to three remote radio heads RH3, RH4 and RH5 which also provide service in different overlapping cells C1, C2 at the same indoor location area A2.

Figure 4:
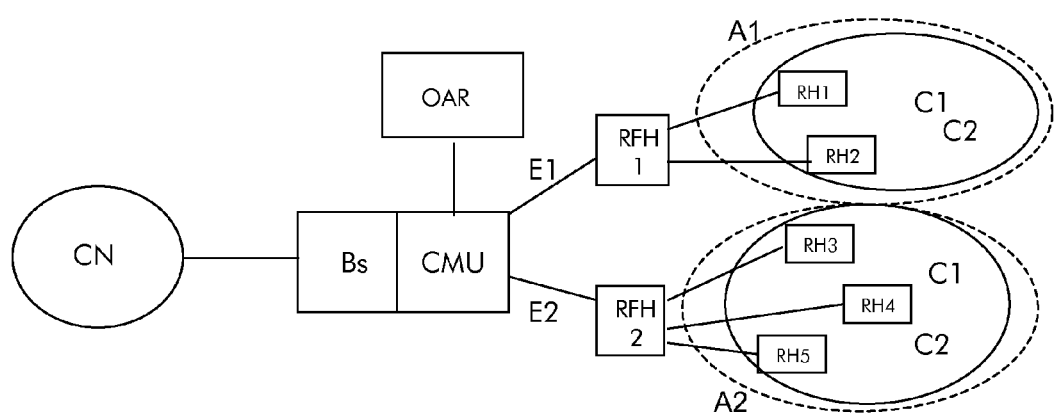
FIG. 4 shows a second example of a wireless cellular indoor communications system, with overlapping cell configuration, according to the invention.

For the sake of generalization, other cell configurations, as the ones illustrated in the examples of FIGS. 3 and 4, are possible according to the invention. Each remote radio head can service a different cell area, or two, or more, remote radio heads can belong the same cell area, said cell areas overlapping inside a certain indoor location area or being in different location areas. The RF hubs can be connected to remote radio heads which serve the same cell or serve different cells.

Figure 5:
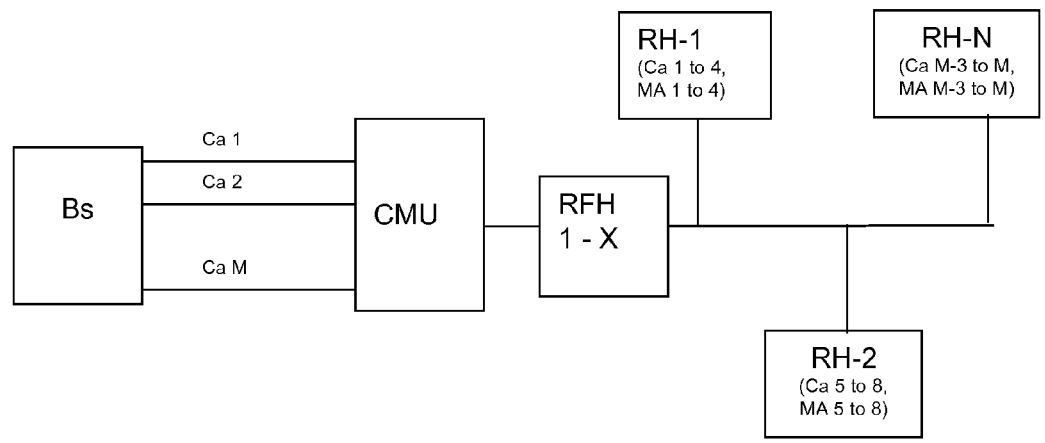
FIG. 5 shows an example of carrier distribution according to the wireless cellular indoor communications method of the invention.

FIG. 5 shows an example of carrier distribution according to the wireless cellular indoor communications method of the invention considering four carriers per remote radio head RH-1 to RH-N. The base station Bs provides the M carriers Ca1 to CaM to the cell management unit CMU which in turn distributes it between the at least one RF Hub RFH 1 to X of the next stage. The one or more RF Hubs distribute carriers 1 to 4 to a first remote radio head RH-1 according to medium access control (MAC) addresses MA1 to MA4 in the Ethernet packets, carriers 5 to 8 to a second remote radio head RH-2 according to MAC addresses 5 to 8, and carriers M-3 to M to an N remote radio head RH-N according to MAC addresses M-3 to M, where M=N×4.

Figure 6:
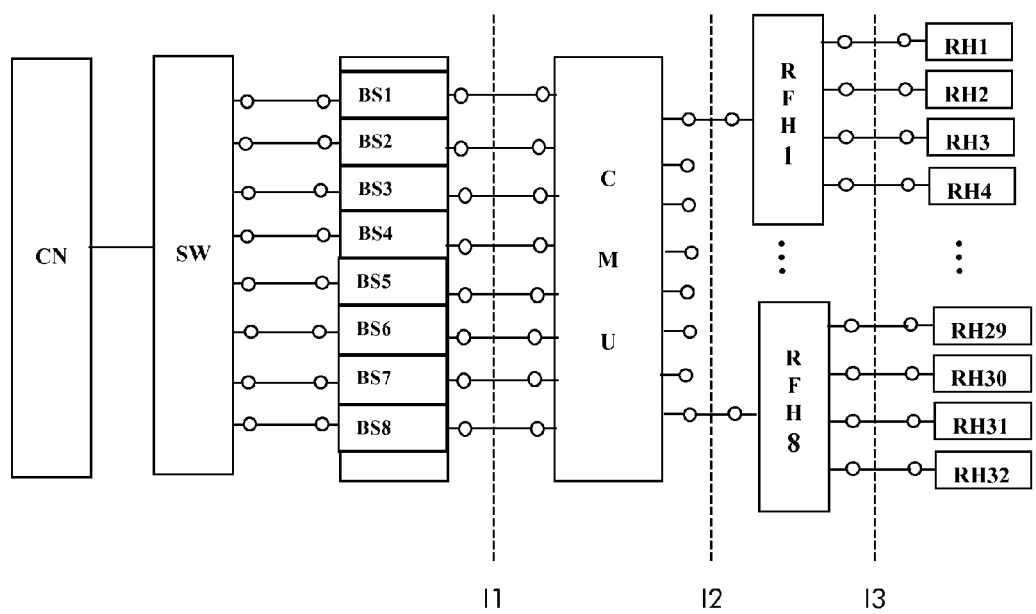
FIG. 6 shows an example block schematic of a wireless cellular indoor communications system according to the invention.

FIG. 6 shows an example block schematic of a wireless cellular indoor communications system according to the invention. In the example of the figure the cell management unit CMU operates on eight base stations BS1 to BS8 and on eight RF Hubs RFH1 to RFH8 (but, of course, more or less base stations Bs and RF Hubs could also be connected to the CMU). Each base station can provide four carriers at individual services. The eight BS can cover different services of different operators. The network between interfaces 11 and 13 is fully transparent, while the remote radio heads RH1 to RH32 are dedicated for individual services.

The invention claimed is:

1. A wireless cellular indoor communications system comprising at least one base station connected to a cell management unit through a first digital connection interface, the cell management unit connected to at least one RF hub through a second digital connection interface, and the at least one RF hub connected to at least one remote radio head through a third digital connection interface, the at least one remote radio head providing service in a certain cell area inside a confined environment, the cell management unit comprising means for providing efficient load balancing at and between base stations through adaptive cell reconfiguration, including shifting un-used carriers from remote radio heads inside areas of low traffic load to remote radio heads inside areas of high traffic load, means for mapping carriers, time, frequency or time-frequency allocations to individual radio heads, means for alignment of individual delays accumulated on the digital connections between the cell management unit and each of the radio heads, means for synchronization of the signals between the cell management unit and the individual remote radio heads, and means for failure detection of the individual digital links between the cell management unit and the remote radio heads.

2. The wireless cellular indoor communications system of claim 1, the means for providing efficient load balancing further comprising:

means for individual load identification for each carrier on each of the radio heads by air interface activity detection and interference sensing, means for de-activation of un-used carriers per remote radio head on an individual basis;

means for shifting carriers from radio heads, where these carriers are not used for radio heads with high load on their active carriers, and means for activation of the shifted carriers at locations where the remote radio heads are loaded over a predetermined value.

3. The wireless cellular indoor communications system of claim 1, wherein the carriers, time, frequency or time-frequency allocations are identified through their MAC addresses.

4. The wireless cellular indoor communications system of claim 1, wherein the first, second and third digital interface is an electrical connection using Ethernet protocol.

5. The wireless cellular indoor communications system of claim 1 wherein the carriers, time, frequency or time-frequency allocations are identified through the connectors of the respective digital lines to which the radio heads are connected.

6. The wireless cellular indoor communications system of claim 1 wherein the first, second and third digital interface is an optical connection using Ethernet protocol.

7. A method for wireless cellular indoor communications, the method comprising a base station transmitting or receiving call or data information to/from a cell management unit through a first digital connection interface, the cell management unit transmitting or receiving call or data information to/from at least one RF hub through a second digital connection interface, and the at least one RF hub transmitting or receiving call or data information to/from at least one remote radio head through a third digital connection interface, the at least one remote radio head providing service in a certain cell area inside a confined environment, and the cell management unit providing efficient load balancing at and between base stations through adaptive cell reconfiguration, including shifting un-used carriers from remote radio heads inside areas of low traffic load to remote radio heads inside areas of high traffic load, mapping carriers, time, frequency or time-frequency allocations to individual radio heads, aligning individual delays accumulated on the digital connections between the cell management unit and each of the radio heads, synchronizing signals between the cell management unit and the individual remote radio heads, and detecting failure of the individual digital links between the cell management unit and the remote radio heads.

8. The method set forth in claim 7, in conjunction with providing efficient load balancing, the method further comprising:

Identifying individual loads for each carrier on each of the radio heads by air interface activity detection and interference sensing;

de-activating un-used carriers per remote radio head on an individual basis;

shifting carriers from radio heads, where these carriers are not used for radio heads with high load on their active carriers; and activating the shifted carriers at locations where the remote radio heads are loaded over a predetermined value.

9. The method set forth in claim 7 wherein the carriers, time, frequency or time-frequency allocations are identified through their MAC addresses.

10. The method set forth in claim 7 wherein the carriers, time, frequency or time-frequency allocations are identified through the connectors of the respective digital lines to which the radio heads are connected.

11. The method set forth in claim 7 wherein the first, second and third digital interface is an electrical connection using Ethernet protocol.

12. The method set forth in claim 7 wherein the first, second and third digital interface is an optical connection using Ethernet protocol.

13. A cell management unit (CMU), comprising:

means for providing efficient load balancing at and between base stations connected to the CMU through adaptive cell reconfiguration, including shifting un-used carriers from remote radio heads inside areas of low traffic load to remote radio heads inside areas of high traffic load, the remote radio heads connected to at least one RF hub, the RF hub connected to the CMU;

means for mapping carriers, time, frequency or time-frequency allocations to individual radio heads;

means for alignment of individual delays accumulated on the digital connections between the CMU and each of the radio heads;

means for synchronization of the signals between the CMU and the individual remote radio heads; and means for failure detection of the individual digital links between the CMU and the remote radio heads.

14. The CMU set forth in claim 13, the means for providing efficient load balancing further comprising:

means for individual load identification for each carrier on each of the radio heads by air interface activity detection and interference sensing;

means for de-activation of un-used carriers per remote radio head on an individual basis;

means for shifting carriers from radio heads, where these carriers are not used for radio heads with high load on their active carriers; and means for activation of the shifted carriers at locations where the remote radio heads are loaded over a predetermined value.

15. The CMU set forth in claim 13 wherein the carriers, time, frequency or time-frequency allocations are identified through their MAC addresses.

16. The CMU set forth in claim 13 wherein the carriers, time, frequency or time-frequency allocations are identified through the connectors of the respective digital lines to which the radio heads are connected.

17. The CMU set forth in claim 13 wherein the first, second and third digital interface is an electrical connection using Ethernet protocol.

18. The CMU set forth in claim 13 wherein the first, second and third digital interface is an optical connection using Ethernet protocol.

* * * * *